No. 822,397. PATENTED JUNE 5, 1906.
G. C. SMITH.
CALIPERS AND DIVIDERS.
APPLICATION FILED OCT. 20, 1904.
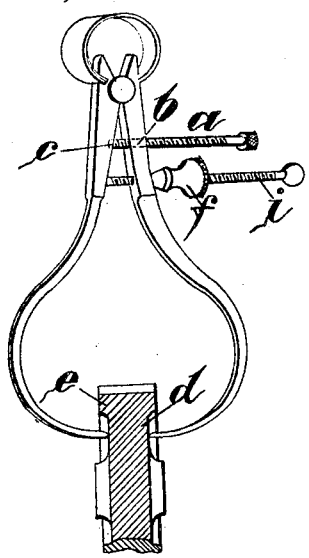
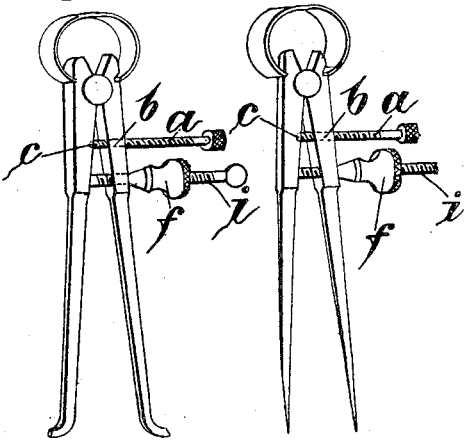
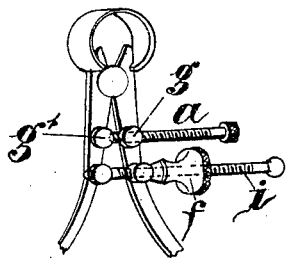
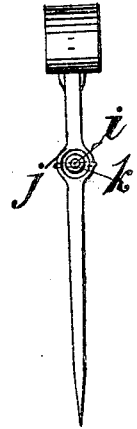
WITNESSES:
W. M. Avery
Isaac B. Owens.
INVENTOR
George C. Smith
BY
[signature]
ATTORNEYS

UNITED STATES PATENT OFFICE.

GEORGE CROCKER SMITH, OF ST. KILDA, NEAR MELBOURNE, VICTORIA, AUSTRALIA, ASSIGNOR TO ALBERT EDWARD LANGFORD, OF MELBOURNE, VICTORIA, AUSTRALIA.

CALIPERS AND DIVIDERS.

No. 822,397.  Specification of Letters Patent.  Patented June 5, 1906.

Application filed October 20, 1904. Serial No. 229,277.

*To all whom it may concern:*

Be it known that I, GEORGE CROCKER SMITH, a citizen of the Commonwealth of Australia, and a resident of St. Kilda, near Melbourne, in the State of Victoria and said Commonwealth, have invented a new and useful Improvement in Calipers and Dividers, of which the following is a specification.

Heretofore when working with ordinary calipers and dividers workmen have experienced much annoyance by reason of the impossibility of readily and securely locking the calipers or dividers in position after an accurate measurement has been taken.

This invention has been devised in order to provide simple and inexpensive means for locking calipers and dividers in position and incidentally for enabling calipers to be used to measure accurately in positions from whence it is not possible to remove them in order to transfer the measurement without slacking them back.

In order that my invention may be readily understood, I will describe it by reference to the accompanying drawings, in which—

Figure 1 is an elevation of a pair of outside calipers constructed with a spring or solid nut for the purpose of adjusting them and showing same fitted with my improvement for locking them in position after the measurement has been taken and illustrating one application of a pair of calipers constructed with my improvement. Fig. 2 illustrates the application of the invention to a pair of inside calipers, and Fig. 3 to a pair of dividers. Fig. 4 is a view showing an alternative construction for the adjustment of my improvement to a different style of calipers, and Fig. 5 is a side elevation showing a modification of my improvement.

The same letters of reference indicate the same or corresponding parts in all the figures.

My improved calipers and dividers consist, essentially, in the addition of a small screw $a$, (in all the figures,) passing through one of the arms or through a projection on one of the arms of a pair of calipers or dividers and bearing against the other arm or a projection upon it. This additional screw is placed parallel to the ordinary adjusting-screw where one is used.

When applied to a pair of outside calipers of the kind illustrated in Fig. 1, the screw $a$ is formed with a knurled head and passes through a tapped hole in one leg of the calipers, as illustrated at $b$, while its end, which may be rounded or left flat or otherwise suitably shaped, is arranged to bear against the inner surface of the other leg of the calipers, as indicated at $c$.

An example of one of the uses which calipers fitted with my improvement can be put to is that illustrated in Fig. 1, which represents a section of part of a spur-wheel and shows the calipers being used for the measurement of the thickness of the web $d$. With ordinary calipers this measurement could not be taken unless there was an opening in the web or flange, because the calipers could not be withdrawn over the rim $e$ without being opened, and it would be impossible to reset them to the required measure. With my improvement, however, after the calipers have been set to the thickness of the web $d$ the set-screw $a$ is turned, so that it bears against the opposite leg of the calipers, and thus prevents them coming closely together. The calipers can then be opened by slacking back the adjusting-nut $f$ until they can be withdrawn from the wheel, after which by drawing them together by said nut $f$ they can be reset, so that the end of the set-screw $a$ bears against the opposite leg of the calipers, when they will be in the same position as when the required measurements were taken before they were shifted. The construction and application of my improvement to inside calipers and dividers (illustrated in Figs. 2 and 3) is practically the same as above described.

Instead of the locking-screw $a$ passing through one leg of the calipers or dividers and bearing against the other leg it can be arranged (as illustrated in Fig. 4) to pass through a small swivel threaded stud $g$, projecting from one leg and having its free end bearing in a small recess made in another small swivel-stud $g'$, projecting from the other leg. With this construction both the locking-screw $a$ and the adjusting-screw $i$ will always remain parallel with each other, while with the previously-described construction they will assume slightly different angles relatively to each other.

In the construction illustrated in Fig. 5 one leg of the calipers or dividers is widened, as indicated at $j$, and the locking-screw $a$, passing through a hole in such widened portion, is mounted in a round nut $k$, which is swiveled on two pins or trunnions, so that it is free to swing within the leg of the calipers or dividers, and therefore enabled to adjust itself in the required position of the locking-screw as the calipers are opened or closed.

The invention can be applied to various makes of calipers or dividers and whether they are fitted with spring, split, or solid nuts for effecting the adjustment or whether they are simply made with a firm joint.

Calipers and dividers constructed as above described will be found to possess many advantages over those not fitted with my improvement, because, as above mentioned, with those fitted the spacing of the calipers can be locked, so that the adjustment is not likely to be altered accidentally, and in the case of outside calipers it enables measurements to be taken and reproduced after the calipers have been opened in order to pass an obstruction, such as the projecting rim of a toothed gear wheel or pulley.

Having now particularly described and ascertained the nature of my said invention and in what manner the same is to be performed, I declare that what I claim is—

1. A measuring device comprising two legs and means connecting them to be relatively adjustable toward and from each other, a screw and nut connected to said legs to move them toward each other, and a separate adjustable means for limiting said movement.

2. A measuring device comprising two legs movable toward and from each other and a spring tending to spread said legs apart, means coacting with the legs and capable of moving them toward each other, and an adjustable device to limit said movement.

In testimony whereof I have signed my name to this specification in the presence of two subscribing witnesses.

GEORGE CROCKER SMITH.

Witnesses:
LANCELOT E. DE MOLE,
SIDNEY HENDLEY.